United States Patent [19]

Ohmae et al.

[11] Patent Number: 4,764,551
[45] Date of Patent: Aug. 16, 1988

[54] DYEABLE POLY-ALPHA-OLEFIN COMPOSITION

[75] Inventors: Tadayuki Ohmae; Kentaro Mashita; Noboru Yamaguchi; Kouichiro Asao, all of Chiba, Japan

[73] Assignee: Sumitomo Chemical Company, Limited, Osaka, Japan

[21] Appl. No.: 116,817

[22] Filed: Nov. 5, 1987

[30] Foreign Application Priority Data

Nov. 5, 1986 [JP] Japan .................. 61-263463

[51] Int. Cl.$^4$ .............................................. C08K 5/04
[52] U.S. Cl. ...................... 524/394; 524/217; 524/521; 526/307; 525/218
[58] Field of Search .............. 524/394, 217, 521; 526/307; 525/218

[56] References Cited

U.S. PATENT DOCUMENTS 3,943,114  3/1976  Hoke ..................... 525/218

FOREIGN PATENT DOCUMENTS 0759534  5/1967  Canada ................. 525/218
22523  11/1967  Japan .

Primary Examiner—Joseph L. Schofer
Assistant Examiner—Peter D. Mulcahy

Attorney, Agent, or Firm—Sughrue, Mion, Zinn, Macpeak and Seas

[57] ABSTRACT

A dyeable poly-α-olefin composition having improved dyeablity, is disclosed, comprising a melt kneaded mixture of (A) 100 parts by weight of a poly-α-olefin;
(B) from 1 to 20 parts by weight of an ethylene copolymer having a melt index as defined in JIS K-6760 at 190° C. in the range of from 1 to 1,000 g/10 min, which is composed of
 (a) from 40 to 95% by weight of ethylene and
 (b) from 5 to 60% by weight of at least one dialkylaminoalkyl acrylamides comonomer represented by the formula:

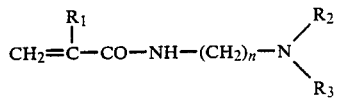

wherein $R_1$ represents hydrogen or a methyl group; $R_2$ and $R_3$ each represents hydrogen or an alkyl group having from 1 to 4 carbon atoms; and n represents an integer of from 2 ro 4; and
(C) from 0 to 3 parts by weight of at least one alkali metal salt of an organic carboxylic acid having from 7 to 24 carbon atoms.

4 Claims, No Drawings

DYEABLE POLY-ALPHA-OLEFIN COMPOSITION

FIELD OF THE INVENTION

This invention relates to a dyeable poly-α-olefin composition. More particularly, the invention relates to a dyeable poly-α-olefin composition which can be easily fabricated into various articles such as fibers, said articles being very excellent in dyeability with anionic dyes.

BACKGROUND OF THE INVENTION

Poly-α-olefins such as polyethylene or polypropylene have excellent physical and mechanical properties and excellent processability, but since they are hydrophobic and chemically inactive, it is very difficult to dye fabricated articles of these polymers. In particular, crystalline polypropylene fibers have various features such that they are lightweight and strong and that they are good in heat retaining properties. Accordingly, at the initial period of the development thereof, these fibers were expected to have wide applications for clothes, etc. as "dreamlike fibers", but since they have a serious fault that they cannot be dyed by an ordinary dyeing method, the fibers have now been used in limited use fields for, e.g., uncolored waddings and carpet pile yarns.

Accordingly, an improvement in dyeability of polypropylene fibers has hitherto been keenly demanded, and various methods have been proposed.

For example, a method of melt spinning a mixture of polypropylene and a material which can be a dyeing site for anionic dyes is realistic and is being watched with keen interest in the point that the characteristics which polypropylene inherent possesses, such as easy spinnability and yarn strength, are not reduced and the point that various kinds of dyes common to nylon yarns and wool can be applied thereto.

In particular, a copolymer of ethylene and dialkylaminoalkyl acrylates comonomer represented by dimethylaminoethyl methacrylate, as described in Japanese Patent Publication No. 22523/67 is good in heat stability and can be very finely and uniformly dispersed in polypropylene by melt kneading and, hence, provides a dyeable poly-α-olefin composition having excellent spinnability.

Also, Japanese Patent Application (OPI) Nos. 66646/73 and 41345/84 show dyeability improving effects of the aforesaid composition by adding thereto various kinds of metal salts of organic carboxylic acids. (The term "OPI" as used herein means an "unexamined published application".)

On the other hand, in regard to the dyeing method, effects of various dyeing assistants and dyeing oils are shown in Japanese Patent Application (OPI) Nos. 154583/81, 154584/81, 133283/82, 149389/83, and 1786/84.

However, as the result of a number of trials for practical use made by the present inventors, it has been confirmed that in the case of dyeing fibers obtained by spinning various known dyeable polypropylene compositions containing a copolymer of ethylene and dialkylaminoalkyl acrylates comonomer as described above, using dyeing methods and equipments which are widely and normally used in the field of dyeing industry at present, the exhaustion speed of dye is low even by the above-described known improved dyeing methods and, hence, the dyeing time must be prolonged to an uneconomical extent.

For example, it has been found that when a tufted carpet made by using fibers obtained from the aforesaid dyeable polypropylene composition as pile yarns is subjected to wince dyeing at 95° C. using a dyeing bath acidified by acetic acid, in order to obtain a satisfactory dyeing exhaustion rate, the dipping time must be prolonged to an extent of from about 1.5 times to about 2 times that in the case of dyeing a tufted carpet made by using 6-nylon yarns or wool spun yarns of the same type. If the dipping time is shorter than the above-specified range, the dyeing properties are deficient to dye only the surface of yarns, whereby the dyed carpet becomes insufficient in various fastnesses such as washing resistance, light resistance, and rubbing resistance.

SUMMARY OF THE INVENTION

An object of this invention is to provide a dyeable poly-α-olefin composition having improved dyeability which is capable of industrially providing fiber products of poly-α-olefin showing a dyeing exhaustion speed of the same level as nylon yarns and wool even in the initial stage of dyeing process, i.e., a relatively low temperature region, while solving the above-described various problems.

As the result of widely and precisely investigating ethylene copolymers which can be compounded with a poly-α-olefin for more increasing the exhaustion speed for anionic dyes as compared with the conventional copolymer of ethylene and dialkylaminoalkyl acrylates comonomer from the foregoing viewpoints, the inventors have discovered that a copolymer of ethylene and dialkylaminoalkyl acrylamides comonomer of a specific composition is effective for the aforesaid purpose and succeeded in attaining the present invention based on the discovery.

That is, according to this invention, there is provided a dyeable poly-α-olefin composition having improved dyeability and comprising a melt kneaded mixture of (A) 100 parts by weight of a poly-α-olefin;

(B) from 1 to 20 parts by weight of an ethylene copolymer having a melt index as defined in JIS K-6760 at 190° C. in the range of from 1 to 1,000 g/10 min, which is composed of (a) from 40 to 95% by weight of ethylene and (b) from 5 to 60% by weight of at least one dialkylaminoalkyl acrylamides comonomer represented by the formula:

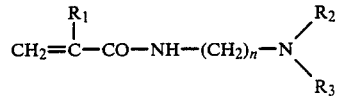

wherein $R_1$ represents hydrogen or a methyl group; $R_2$ and $R_3$ each represents hydrogen or an alkyl group having from 1 to 4 carbon atoms; and n represents an integer of from 2 to 4; and (C) from 0 to 3 parts by weight of at least one alkali metal salt of an organic carboxylic acid having from 7 to 24 carbon atoms.

DETAILED DESCRIPTION OF THE INVENTION

Examples of the poly-α-olefin (A) for use in this invention are various crystalline homopolymers of α-olefin such as polyethylene, polypropylene, polybutene-1, and poly-4-methylpentene-1; various crystalline copolymers such as an ethylene-propylene copolymer, a butene-1-propylene copolymer, and a butene-1-ethylene copolymer; copolymers of ethylene and unsaturated esters comonomer, such as an ethylene-vinyl acetate copolymer, an ethylene-methyl methacrylate copolymer, and an ethylene-ethyl acrylate copolymer; and a saponified product of an ethylene-vinyl acetate copolymer. Among them, crystalline polypropylene or a crystalline propylene copolymer each having a melt index as defined in JIS K-6758 at 230° C. in the range of from 2 to 100 g/10 min has particularly large significance from the industrial viewpoint.

Specific examples of the dialkylaminoalkyl acrylamides comonomer (b) for the ethylene copolymer (B) in this invention are dimethylaminoethyl acrylamide, dimethylaminopropyl acrylamide, dimethylaminobutyl acrylamide, diethylaminoethyl acrylamide, diethylaminopropyl acrylamide, diethylaminobutyl acrylamide, di-n-propylaminoethyl acrylamide, di-n-propylaminopropyl acrylamide, and N-(1,1-dimethyl-3-dimethylaminopropyl)acrylamide and corresponding methacrylamide derivatives thereto. Among them, dimethylaminopropyl acrylamide, dimethylaminopropyl methacrylamide, dimethylaminoethyl acrylamide, and dimethylaminoethyl methacrylamide are particularly preferred.

A suitable proportion of the dialkylaminoalkyl acrylamides comonomer unit in the ethylene copolymer is from 5% by weight to 60% by weight and preferably from 10% by weight to 50% by weight. If the proportion is less than 5% by weight, the poly-α-olefin composition is lacking in the effect for improving dyeing properties, and if the proportion is higher than 60% by weight, there are problems in the yarn properties and economy of the poly-α-olefin composition formed.

Furthermore, the ethylene copolymer (B) may be a ternary or more copolymer which further contains unsaturated esters comonomer unit, such as vinyl acetate, vinyl propinate, methyl acrylate, ethyl acrylate, methyl methacrylate, dimethylaminoethyl acrylate, and dimethylaminoethyl methacrylate, in the range of up to 20% by weight in addition to the aforesaid dialkylaminoalkyl acrylamides comonomer for the purpose of improving compatibility thereof with the poly-α-olefin (A).

The melt index as defined in JIS K-6760 at 190° C. of the ethylene copolymer (B) in this invention is in the range of from 1 to 1,000 g/10 min and preferably from 20 to 500 g/min. If the melt index is lower than 1 g/10 min, the ethylene copolymer is lacking in compatibility in the case of forming the poly-α-olefin composition and causes a problem in spinning properties of the composition. If the melt index is higher than 1,000 g/10 min, there is a problem in washing fastness after dyeing the fibers of the poly-α-olefin composition.

For producing the ethylene copolymer, a high-pressure continuous process is usually applied. That is, ethylene and the dialkylaminoalkyl acrylamides comonomer are continuously supplied to a stirring vessel-type or tubular-type reactor together with a free radial catalyst such as oxygen, an organic peroxide, or a diazo compound and polymerized at a pressure of from 500 to 3,000 kg/cm$^2$ and at a temperature of from 100° to 300° C. In this case, for controlling the molecular weight, a chain transfer agent such as ethane, propane, and propylene can be used.

In the poly-α-olefin composition of this invention, the addition amount of the ethylene copolymer (B) is from 1 to 20 parts by weight and preferably from 2 to 10 parts by weight based on 100 parts by weight of the poly-α-olefin (A). If the amount is less than 1 part by weight, the composition is deficient in dyeing properties, and if the amount is larger than 20 parts by weight, the spinning properties of the composition and the characteristics of yarns formed are impaired.

As the alkali metal salt (C) of an organic carboxylic acid having from 7 to 24 carbon atoms which is used, if desired, for the composition of this invention for the purpose of improving the internal permeability of dye, one or more kinds of the salts described in Japanese Patent Application (OPI) No. 66646/73 can be used. For example, there are sodium salts, potassium salts, and lithium salts of various organic acids such as higher fatty acids having preferably from 10 to 24 carbon atoms (such as captic acid, lauric acid, myristic acid, palmitic acid, stearic acid, oleic acid, and behenic acid), aromatic acids (such as benzoic acid, p-t-butylbenzoic acid, phenylacetic acid, and 1,8-naphthylic acid), and nicotinic acids. Among them, sodium stearate, sodium benzoate, sodium p-t-butylbenzoate, sodium nicotinate, potassium stearate, and potassium benzoate are preferred.

The addition amount of the alkali metal salt of organic carboxylic acid is in the range of up to 3 parts by weight and preferably from 0 to 2 parts by weight based on 100 parts by weight of the poly-α-olefin (A). If the amount is larger than the aforesaid range, not only the deep dyeing effect corresponding to the increased addition amount is not obtained, but also the spinning properties of the composition and the properties of yarns formed are impaired.

The dyeable poly-α-olefin composition of this invention may, if desired, contain various additives such as heat-resistant stabilizers, antioxidants, ultraviolet deterioration preventing agents, antistatic agents, and flame retarders, or may further contain a small amount of an inorganic filler or pigment.

There is no particular restriction about the method for producing the composition of this invention, but the components (A), (B), and (C) described above are generally melt kneaded together with various additives described above simultaneously or stepwise in a resin processing machine such as an extruder or a Banbary mixer at a temperature higher than the melting point of the poly-α-olefin, preferably from 200° C. to 280° C., followed by granulation.

The dyeable poly-α-olefin composition of this invention can be formed into various fibers or fiber products by melt spinning under substantially the same conditions for melt spinning the poly-α-olefin as the base material and further, if desired, applying thereto drawing, crimping, or spinning. Also, the fibers of the composition of this invention can be combined with other chemical fibers or natural fibers.

For dyeing the fibers or fiber products, a dyeing method for applying to nylon yarns or wool, e.g., as disclosed in Japanese Patent Application (OPI) No. 149389/83 can be applied. That is, anionic dyes such as acid dyes, premetallized acid dyes, direct dyes, and acid mordant dyes are dissolved in a dyeing bath, a padding bath, or a dyeing paste, which is adjusted to a proper acidic condition by an inorganic or organic acid such as acetic acid, formic acid, sulfuric acid, phosphoric acid, boric acid, citric acid, tartaric acid, oxalic acid, benzoic acid, and salicylic acid or a mixed acid thereof, and if desired, in the presence of various dyeing assistants such as alkyl phosphates or alkali metal salts thereof, levelling agents, retarding agents, printing pastes, etc., the fibers or fiber products are brought into contact with the dye solution and heat treated at about 100° C. Practically, various exhaustion dyeing method, continuous dyeing method, printing method, etc. can be applied.

The dyeable poly-α-olefin composition of this invention can be melt fabricated into various forms such as films, sheets, and tubes in addition to the aforesaid fibers, and these articles can also be dyed in optional color tone.

Then, the invention is further explained by the following Examples and Comparative Examples, but the invention is not restricted by them.

In addition, the dyeing method and evaluations of the dyeing characteristics and color fastness are as follows.

(1) Dyeing Method:

A predetermined amount of a dye is dissolved in a dyeing bath having a bath ratio of 1:60 and containing 2% owf of acetic acid or formic acid and 3% owf of a dyeing assistant, Electrostripper ®-K (a potassium salt of alkyl phosphate made by Kao Atlas Co., Ltd.), and the bath is heated to 50° C. Then, 3 g of each fiber sample is dipped in the dyeing bath at 50° C., and the temperature of the bath is raised at a rate of 1° C./min while vertically stirring the sample in the bath. After reaching 100° C. over a period of 50 minutes, the dyeing of the sample is continued for an additional 30 minutes.

The fiber sample thus dyed is withdrawn from the bath, washed with water, and soaped in a soaping bath having a bath ratio of 1:60 and containing 2 g/liter of Monogen ® (a sodium salt of alkyl sulfate made by Daiichi Kogyo Seiyaku Co., Ltd.) for 5 minutes at 60° C., followed by further washing with water and drying.

(2) $DR_{70}$ (Dye Exhaustion Rate at 70° C.):

During the above-described temperature-raising process in the dyeing method, about 2 ml of the dyeing liquid is sampled when the bath temperature has become 70° C., and the concentration of the remaining dye in the sample is measured by the colorimetery. Then, the dye exhaustion rate is calculated as follows. That is, the exhaustion rate is given by $[100 \times (a-b)/a]$, wherein a is an absorbance of the dyeing liquid before dyeing at the characteristic absorption wavelength of the dye, and b is an absorbance of the dyeing liquid sampled at 70° C.

(3) $DR_{100}$ (Final Exhaustion Rate at 100° C.):

The final exhaustion rate is given by $[100 \times (a-c)/a]$, wherein a is the same as defined above, and c is an absorbance of the dyeing liquid after dyeing for 30 minutes at 100° C. at the characteristic absorption wavelength of the dye.

(4) FR (Fixed Dyeing Rate):

The fixed dyeing rate is given by $[DR_{100} - 100d/a]$, wherein a is the same as above, and d is an absorbance of the remaining liquid after soaping at the characteristic absorption wavelength of the dye.

(5) Light Fastness:

The light fastness is measured according to JIS L-0842. The light source is carbon arc, and after irradiating the sample with the light source for 80 hours at 63° C., the color tone is evaluated in comparison with a blue scale. The rating is from Grade 1 (worst) to Grade 8 (best).

(6) Rubbing Fastness:

The rubbing fastness is measured according to JIS L-0803. The load is 200 g, and after rubbing the sample with wet cotton (JIS L-0803) 100 times at a frequency of 30 times/min. The rating is from Grade 1 (worst) to Grade 5 (best).

EXAMPLES 1 to 9

By means of a 30 mmφ extruder (L/D=20), 10 kg of each of various dyeable polypropylene compositions (DC-1 to DC-6) as shown in Table 1 was prepared. That is, predetermined amounts of three kinds of main components, polypropylene, ethylene copolymer, and sodium salt of organic carboxylic acid as shown in the footnote of Table 1 were mixed together with 0.1 part by weight of a stabilizer, Irganox ® 1010 (made by Ciba Geigy AC) and 0.5 part by weight of an ultraviolet light absorbent, Sumisorb ® 300 (made by Sumitomo Chemical Company, Limited) by means of a Henshel mixer, and the mixture was melt kneaded by means of an extruder to provide pellets of the composition. The pellets thus obtained were supplied to a spinning machine having a 12-holes nozzle of 0.8 mm in diameter of the hole equipped to the tip of a 25 mmφ extruder (L/D=15), melt spun at a resin temperature of 240° C. in an extrusion amount of 1 kg/hour and at a winding rate of 450 meters/min, and then drawn to thrice by running on a hot plate of 110° C. to provide a multifilament sample of 10 deniers/filament. The spinning operation was continuously performed for 3 hours, but no cutting of yarn occurred in the case of each composition and homogeneous multifilaments having smooth surface and gloss were obtained.

Each of the multifilament sample yarns thus prepared was dyed with an acid dye or a premetallized acid dye in an acetic acid- or formic acid-acidified dyeing bath and then soaped. In each case, the dyeing properties of the sample and the fastnesses of the dyed sample were good as shown in Table 2, and $DR_{70}$ of each sample dyed was at a high level.

COMPARATIVE EXAMPLES 1 to 9

Various dyeable polypropylene compositions (FR-1 to FR-6) containing a copolymer of dimethylaminoethyl methacrylate as shown in Table 1 were prepared by the same method and under the same conditions as described in Examples 1 to 9. Each of the compositions was spun using the same spinning machine and under the same conditions as in the aforesaid Examples and drawn to provide sample yarns of multifilaments (12 filaments) of 10 deniers/filament. About each sample yarn, the dyeing test was applied by the same manner and under the same conditions as the aforesaid Examples, and dyeing properties and fastnesses shown in Table 2 were obtained.

There was no problem about the spinning properties in each composition, and the yarn quality was uniform and good in each case. But, the value of $DR_{70}$ showing the exhaustion rate of dye was in a very low level in each case as compared with the compositions of this invention in the aforesaid Examples. Also, these compositions were inferior in fixed dyeing rate and fastness.

TABLE 1

| Sample Name of Composition | Polypropylene (weight parts) | Ethylene Copolymer (weight parts) | Organic Carboxylic Acid Salt (weight parts) |
|---|---|---|---|
| DC-1 | P-1 (95) | E-1 (5) | — |

TABLE 1-continued

| Sample Name of Composition | Polypropylene (weight parts) | Ethylene Copolymer (weight parts) | Organic Carboxylic Acid Salt (weight parts) |
|---|---|---|---|
| DC-2 | P-1 (94) | E-1 (5) | S-1 (1) |
| RF-1 | P-1 (95) | E-3 (5) | — |
| RF-2 | P-1 (94) | E-3 (5) | S-1 (1) |
| DC-3 | P-1 (93) | E-2 (7) | — |
| DC-4 | P-1 (92.5) | E-2 (7) | S-2 (0.5) |
| RF-3 | P-1 (93) | E-4 (7) | — |
| RF-4 | P-1 (92.5) | E-4 (7) | S-2 (0.5) |
| DC-5 | P-2 (94) | E-1 (6) | — |
| RF-5 | P-2 (94) | E-3 (6) | — |
| DC-6 | P-1 (97) | E-5 (3) | — |
| RF-6 | P-1 (97) | E-6 (3) | — |

[Note]
P-1: Noblen ® FL800 (made by Sumitomo Chemical Company, Limited, polypropylene, homopolymer grade, MFI (melt index) = 10 g/10 min according to JIS K-6758), pellet form.
P-2: Noblen ® WF727R (made by Sumitomo Chemical Company, Limited, polypropylene, randum copolymer grade, ethylene copolymer content = 4% by weight, MFI = 30 g/10 min according to JIS K-6758), pellet form.
E-1: Copolymer of ethylene and dimethylaminopropyl acrylamide of 60/40 in weight ratio (MFI = 410 g/10 min according to JIS K-6760), pellet form.
E-2: Copolymer of ethylene and dimethylaminopropyl methacrylamide of 72/28 in weight ratio (MFI = 96 g/10 min according to JIS K-6760), pellet form.
E-3: Copolymer of ethylene and dimethylaminoethyl methacrylate of 60/40 in weight ratio (MFI = 360 g/10 min according to JIS K-6760), pellet form.
E-4: Copolymer of ethylene and dimethylaminoethyl methacrylate of 71/29 in weight ratio (MFI = 100 g/10 min according to JIS K-6760), pellet form.
E-5: Copolymer of ethylene and dimethylaminopropyl acrylamide of 50/50 in weight ratio (MFI = 55 g/10 min according to JIS K-6760), pellet form.
E-6: Copolymer of ethylene and dimethylaminoethyl methacrylate of 51/49 in weight ratio (MFI = 470 g/10 min according to JIS K-6760), pellet form.
S-1: Sodium salt of higher fatty acid mixture (5 parts by weight of sodium myristate, 30 parts by weight of sodium palmitate, and 65 parts by weight of sodium stearate), flake form, water content = 3 parts by weight.
S-2: Finely crushed crystal powder of sodium benzoate.

TABLE 2

| | Yarn Composition | Dye Trade Name | Dye C.I. No. | Dye Concentration (%, owf) | Acid (2%, owf) | Dyeing Characteristics (%) $DR_{70}$ | Dyeing Characteristics (%) $DR_{100}$ | Dyeing Characteristics (%) FR | Light Fastness (Grade) | Rubbing Fastness (Grade) |
|---|---|---|---|---|---|---|---|---|---|---|
| Example 1 | DC-1 | Aminyl ® Blue E-PRL | Blue 129 | 1.1 | Formic Acid | 69 | 95 | 82 | 6 | 5 |
| Example 2 | DC-2 | Aminyl ® Blue E-PRL | " | " | " | 78 | 99 | 87 | 6–7 | 5 |
| Example 3 | DC-3 | Aminyl ® Blue E-PRL | " | " | " | 72 | 94 | 81 | 6 | 4–5 |
| Example 4 | DC-4 | Aminyl ® Blue E-PRL | " | " | " | 75 | 98 | 88 | 6 | 5 |
| Example 5 | DC-6 | Aminyl ® Blue E-PRL | " | " | " | 71 | 96 | 80 | 6 | 5 |
| Comparative Example 1 | RF-1 | Aminyl ® Blue E-PRL | " | " | " | 34 | 87 | 69 | 5 | 4 |
| Comparative Example 2 | RF-2 | Aminyl ® Blue E-PRL | " | " | " | 41 | 94 | 75 | 5 | 4 |
| Comparative Example 3 | RF-3 | Aminyl ® Blue E-PRL | " | " | " | 32 | 85 | 61 | 4–5 | 4 |
| Comparative Example 4 | RF-4 | Aminyl ® Blue E-PRL | " | " | " | 53 | 96 | 80 | 5 | 5 |
| Comparative Example 5 | RF-6 | Aminyl ® Blue E-PRL | " | " | " | 31 | 83 | 59 | 4–5 | 4 |
| Example 6 | DC-1 | Lanyl ® Red GG | Red 211 | 2.0 | Acetic Acid | 59 | 93 | 79 | 5 | 4–5 |
| Example 7 | DC-5 | Lanyl ® Red GG | " | " | " | 66 | 95 | 82 | 5 | 4–5 |
| Comparative Example 6 | RF-1 | Lanyl ® Red GG | " | " | " | 28 | 85 | 66 | 4–5 | 3 |
| Comparative Example 7 | RF-5 | Lanyl ® Red GG | " | " | " | 39 | 89 | 73 | 4–5 | 4 |
| Example 8 | DC-2 | Aminyl ® Yellow E-5GN | Yellow 110 | 1.0 | Formic Acid | 81 | 100 | 92 | 6–7 | 5 |
| Example 9 | DC-5 | Aminyl ® Yellow E-5GN | " | " | " | 77 | 98 | 87 | 6–7 | 5 |
| Comparative Example 8 | RF-2 | Aminyl ® Yellow E-5GN | " | " | " | 47 | 95 | 83 | 6 | 5 |
| Comparative Example 9 | RF-5 | Aminyl ® Yellow E-5GN | " | " | " | 42 | 91 | 80 | 5 | 4–5 |

[Note]
Aminyl ® Blue E-PRL: Acid dye made by Sumitomo Chemical Company, Limited
Lanyl ® Red GG: premetallized acid dye made by Sumitomo Chemical Company, Limited
Aminyl ® Yellow E-5GN: acid dye made by Sumitomo Chemical Company, Limited.

As described above, the characteristic features of the dyeable poly-α-olefin composition of this invention reside in the points that the composition can be easily fabricated into extrusion molded articles such as fibers, tubes, films, and sheets; blow molded articles such as bottles; and injection molded articles such as containers and hungers under substantially the same conditions as in the case of using the poly-α-olefin which is the base material of the composition and that the fabricated or molded articles can be fast dyed by ordinary anionic dyes in optional color tone.

In particular, the application of the composition of this invention for fiber products is important from the industrial viewpoint. That is, for dyeing the fibers or fiber products obtained by melt spinning the composition of this invention, various dyeing methods and apparatus, which are widely used in the dyeing industry for nylon yarns and wool, such as a dipping method, a continuous dyeing method, and a textile printing method, can be commonly employed, and in the case of employing any dyeing method, the dye deeply permeates into the inside of the fibers, whereby not only high dyeing properties are obtained, but also the fibers thus dyed are excellent in washing fastness, light fastness, and rubbing fastness. Furthermore, since the dye exhaustion rate of the fibers are excellent even at the initial stage of dyeing process, i.e., under a low-temperature condition of from about 50° C. to 70° C., the fibers obtained from the composition of this invention can be dyed with less shade of color densities in the case of dyeing the fibers as conjugagte yarns or fabrics such as blended spun yarns, co-twisted union yarns, and union cloths with other kind of anionically dyeable fibers showing high dye exhaustion rate, such as nylon yarns and/or wool.

While the invention has been described in detail and with reference to specific embodiments thereof, it will be apparent to one skilled in the art that various changes and modifications can be made therein without departing from the spirit and scope thereof.

What is claimed is:

1. A dyeable poly-α-olefin composition having improved dyeablity and comprising a melt kneaded mixture of
(A) 100 parts by weight of a poly-α-olefin;
(B) from 1 to 20 parts by weight of an ethylene copolymer having a melt index as defined in JIS K-6760 at 190° C. in the range of from 1 to 1,000 g/10 min, which is composed of
(a) from 40 to 95% by weight of ethylene and
(b) from 5 to 60% by weight of at least one dialkylaminoalkyl acrylamides comonomer represented by the formula:

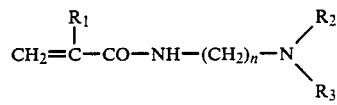

wherein $R_1$ represents hydrogen or a methyl group; $R_2$ and $R_3$ each represents hydrogen or an alkyl group having from 1 to 4 carbon atoms; and n represents an integer of from 2 to 4; and
(C) from 0 to 3 parts by weight of at least one alkali metal salt of an organic carboxylic acid having from 7 to 24 carbon atoms.

2. A poly-α-olefin composition as claimed in claim 1, wherein the organic carboxylic acid in (C) is at least one member selected from a higher fatty acid having from 10 to 24 carbon atoms, benzoic acid, p-t-butylbenzoic acid, and nicotinic acid.

3. A poly-α-olefin composition as claimed in claim 1, wherein the poly-α-olefin (A) is crystalline polypropylene.

4. A poly-α-olefin composition as claimed in claim 1, wherein the dialkylaminoalkyl acrylamides comonomer (b) is at least one member selected from dimethylaminopropyl acrylamide, dimethylaminopropyl methacrylamide, dimethylaminoethyl acrylamide, and dimethylaminoethyl methacrylamide.

* * * * *